United States Patent [19]
Brooke

[11] 3,837,474
[45] Sept. 24, 1974

[54] ARTICLE HANDLING APPARATUS
[75] Inventor: Arthur Alan Brooke, Toronto, Canada
[73] Assignee: Dalamere & Williams Company, Limited, Toronto, Ontario, Canada
[22] Filed: June 18, 1973
[21] Appl. No.: 371,233

Related U.S. Application Data
[62] Division of Ser. No. 198,179, Nov. 12, 1971.

[52] U.S. Cl. .............................................. 198/240
[51] Int. Cl. .......................................... B65q 47/24
[58] Field of Search ..... 198/33 AB, 33 R, 180, 179, 198/134; 271/79

[56] References Cited
UNITED STATES PATENTS
2,643,778    6/1953    Socke ................................. 198/210
2,766,870   10/1956    Baker ................................. 198/180
3,269,516    8/1966    Lucas ............................. 198/33 AB

*Primary Examiner*—Richard E. Aegerter
*Attorney, Agent, or Firm*—Dike, Bronstein, Roberts, Cushman & Pfund

[57] ABSTRACT

Apparatus comprising a conveyor provided with pairs of jaws arranged to take hold of the upper edges of the tea bags presented thereto in succession in a common plane, turn the tea bags around to an angular position with respect to said plane of presentation and deposit them in a column, for example, on a counter with the bags in parallel relation.

7 Claims, 8 Drawing Figures

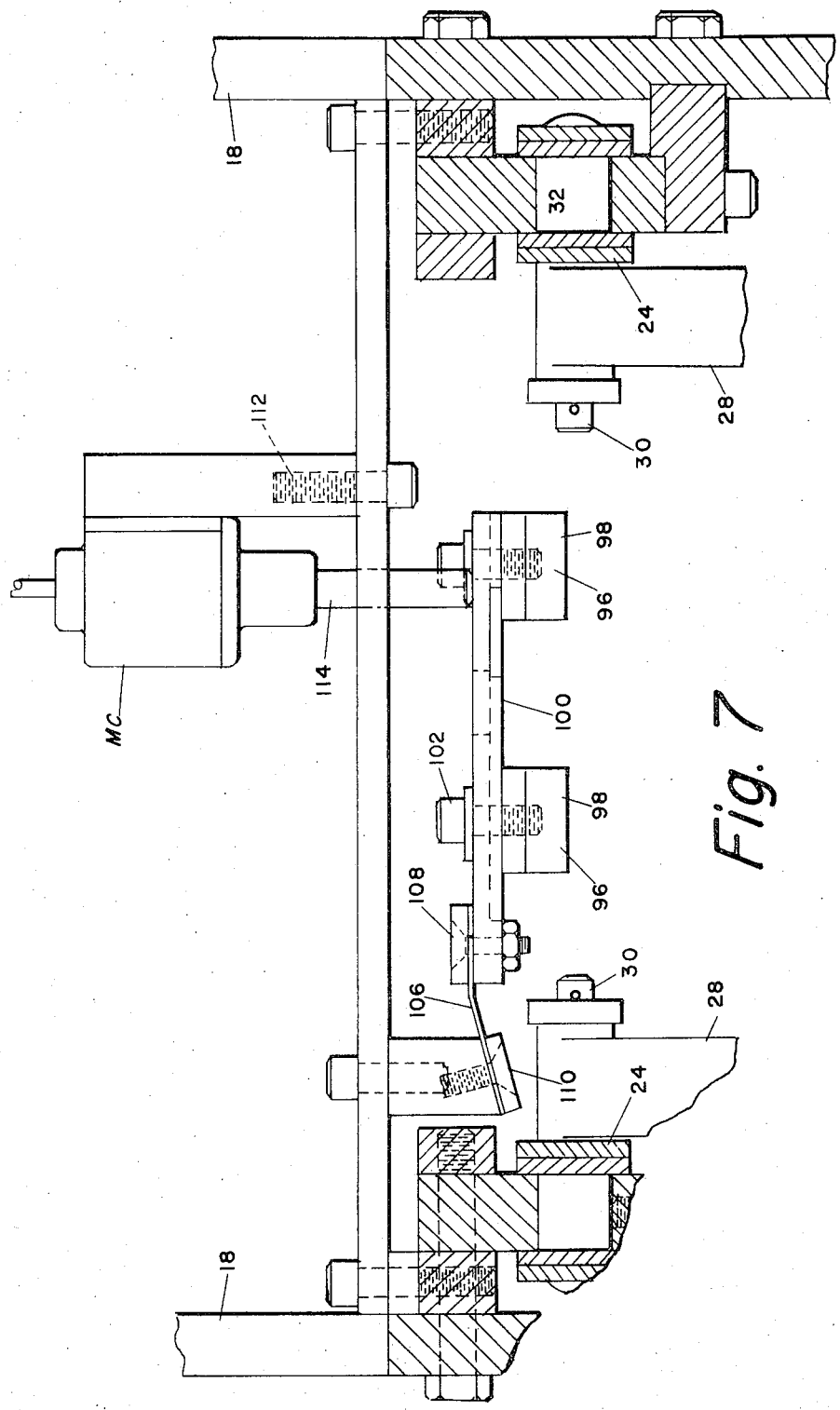

ARTICLE HANDLING APPARATUS

This is a division, of application Ser. No. 198,179, filed on Nov. 12, 1971.

BACKGROUND OF THE INVENTION

Apparatus designed to redistribute articles moving along in a single row to form two rows and to orient the articles during such redistribution is not new, such apparatus being commonly employed in container filling and labelling machinery and in machinery for loading containers into cartons. Apparatus of the foregoing kind is designed for relatively large and bulky articles and hence has no utility for the relatively small articles such as tea bags and like relatively flat packets and is not adapted to be modified or redesigned for such purposes. The apparatus herein illustrated is designed to handle relatively small, substantially flat articles, specifically tea bags which have just been filled while travelling along in single file edge-to-edge to turn them around to dispose them in parallel face-to-face relation in a single or double column.

SUMMARY

The apparatus disclosed herein is to take tea bags presented thereto in succession in a common plane, for example, from a bag closing machine, turn them at angles to said plane and deposit them in one or two columns face-to-face, for example, in a counter from which they may subsequently be removed in predetermined numbers and deposited in cartons, and comprises a continuous orienting conveyor arranged with a portion thereof adjacent the place of presentation and a portion thereof adjacent the place of deposit, uniformly spaced instrumentalities mounted on the conveyor at intervals corresponding to the spacing of the packets presented thereto, said instrumentalities being movable with the conveyor in timed relation with the presentation of the packets to the instrumentalities so that successive instrumentalities meet the packets at the place of presentation, means operative to cause each instrumentality at the place of meeting with a packet to take hold of said edge of the packet, means operable as the instrumentality travels with the conveyor toward the place of deposit to turn the packet around to said angle, and means at the place of deposit for releasing the hold of said instrumentality on the packet. The instrumentalities are rotatably mounted on the conveyor and there is means fixed with respect to the movement of the conveyor to effect their rotation as they travel. The instrumentalities are further mounted for movement transversely of the conveyor and there is means fixed with respect to the movement of the conveyor to effect movement of one instrumentality to one side of the center line of the conveyor and the next to the other side so as to deposit the packets in two rows side-by-side. The conveyor comprises spaced parallel chains between which there are mounted carriers spaced lengthwise of the chains. Bars are mounted on the carriers for movement transversely thereof with respect to the direction of movement of the conveyor and the instrumentalities which are in the form of pairs of jaws are mounted on the bars. A link is pivotally connected at one end to each pair of jaws at a radial distance from the axis of rotation thereof and at its other end to the carrier and operates when the bars are moved transversely to effect rotation of the jaws. There is also means operative in the event of malfunctioning of the apparatus and/or the counter at the place of deposit to release the packets before they reach the place of deposit to allow them to fall on a counter provided for this purpose. Invention also resides in a method of reforming a single line of relatively flat envelope-like packets arranged with their broad sides in a common plane and with their edges aligned into two lines in which the packets are collocated with their broad sides face-to-face, comprising gripping the edges of successive packets in said common plane, moving them linearly along a predetermined path, while so moving them linearly moving them laterally and simultaneously rotating them about axes situated in said common plane and perpendicular to said edges, and following such lateral and rotational movement depositing them in succession in one or more columns.

The invention will now be described in greater detail with reference to the accompanying drawings wherein:

FIG. 7 is a transverse elevation taken on the line 7—7 of FIG. 1; and

FIG. 8 is a circuit diagram for the sensing means.

Figure 1:
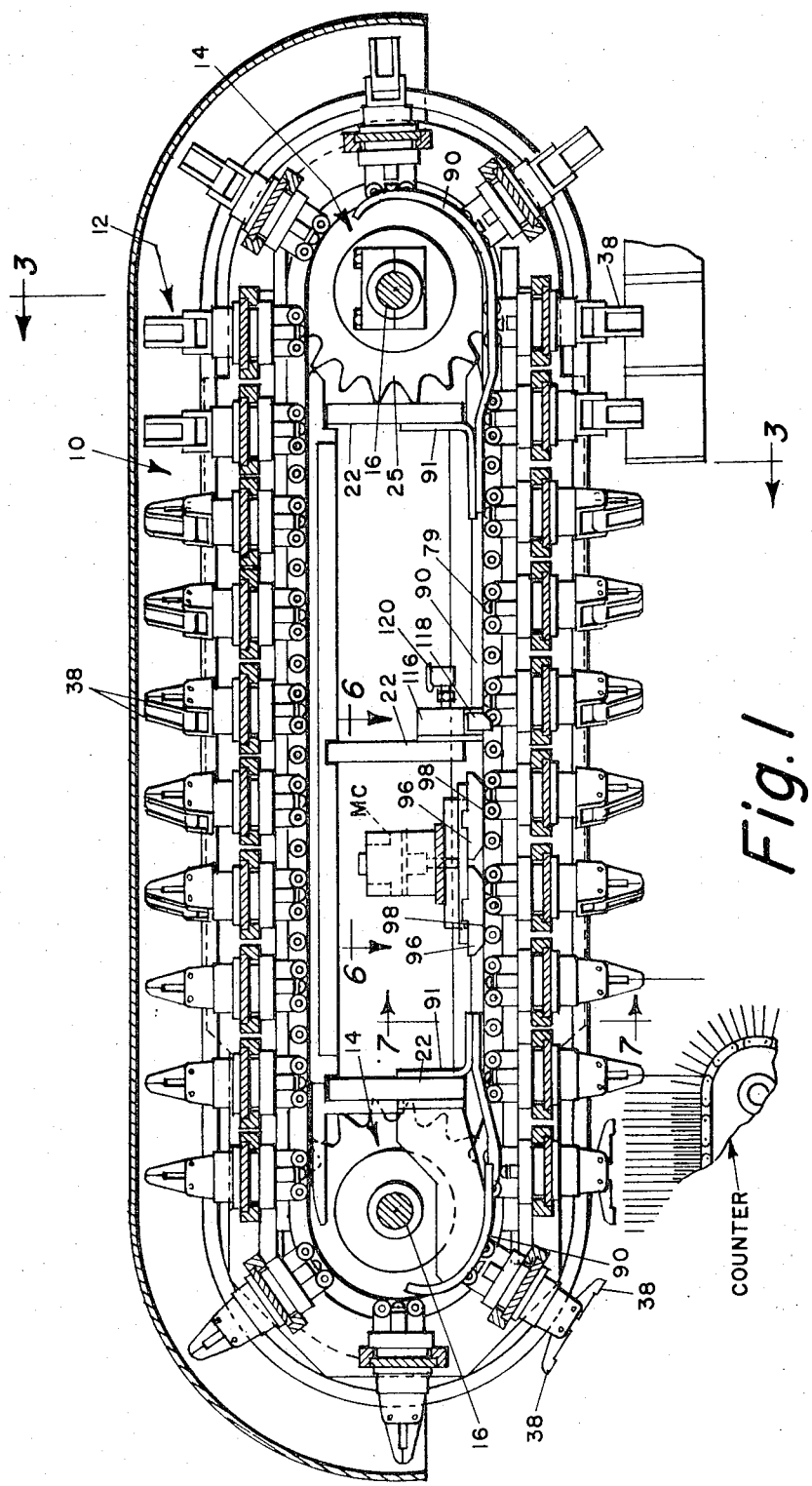
FIG. 1 is a side elevation of the orienting conveyor of this invention.
Figure 3:
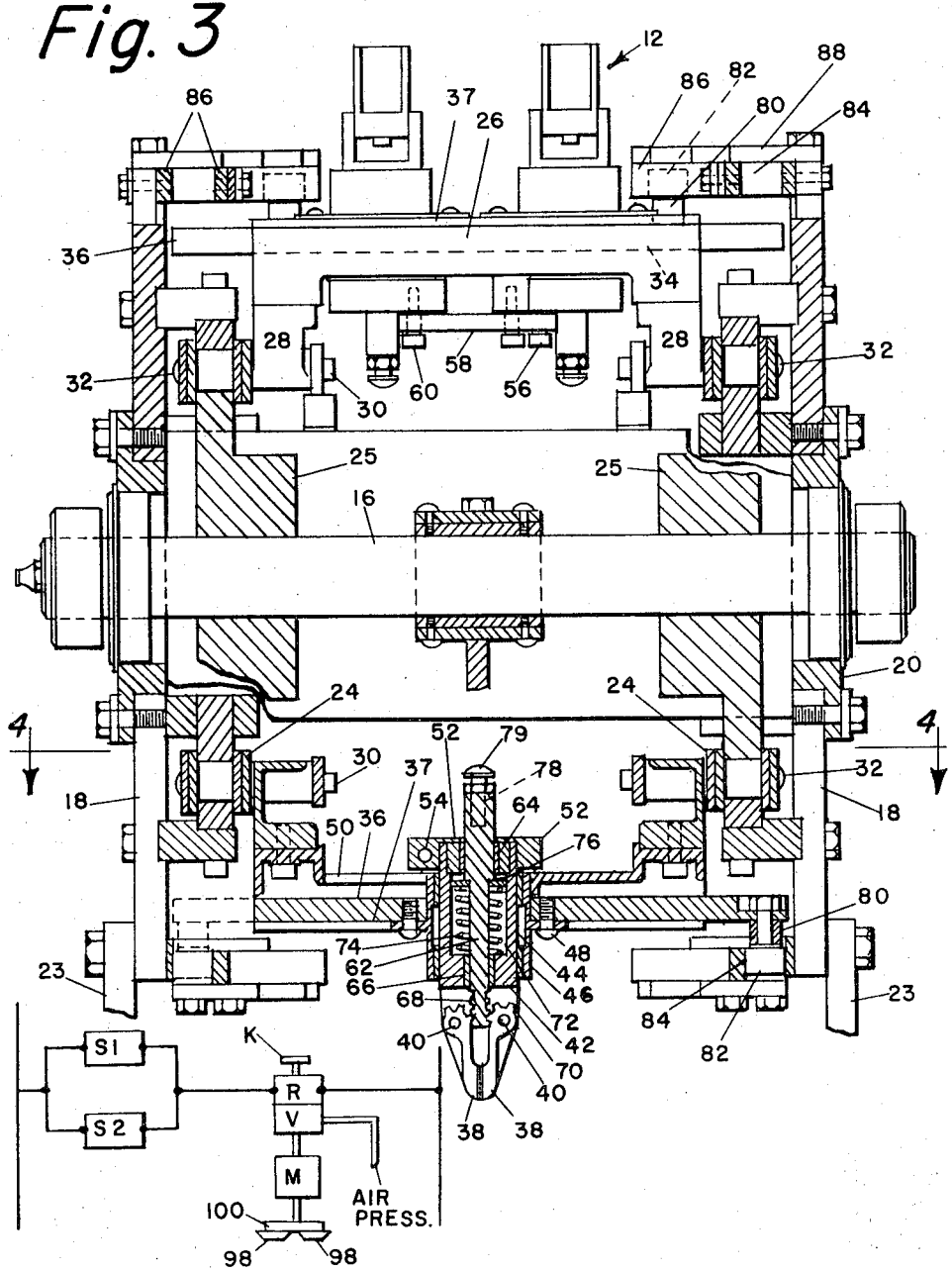
FIG. 3 is a transverse vertical section taken on the line 3—3 of FIG. 1.

Referring to the drawings (FIG. 1), the apparatus comprises a continuous orienting conveyor 10 on which there are mounted at uniformly spaced intervals instrumentalities in the form of pairs of jaws 12, the conveyor being entrained about longitudinally spaced sprocket means 14—14 mounted on a supporting frame comprising transversely spaced side members 18—18 (FIG. 3) provided with bearing members 20—20 at their opposite ends for rotatably receiving said shafts 16—16 and transversely disposed members 22 joining the side members. Supporting legs 23 are bolted to the side members at opposite ends for mounting the structure in the proper relation to conveyor means 11 (FIG. 5) for supplying tea bags thereto from filling and closing apparatus on which the tea bags are arranged in a single line edge-to-edge.

The conveyor 10 comprises spaced parallel link chains 24—24 (FIG. 3) entrained about spaced sprockets 25—25 comprising the sprocket means fixed to the shafts 16—16. Carrier members 26 are mounted by means of blocks 28 secured at their opposite ends on extensions 30—30 of adjacent pairs of pins 32—32 connecting the links of the chain. The carriers are arranged in spaced parallel relation longitudinally of the chains and are situated on the outer sides of the chains and each contains a transversely extending way 34 of substantially rectangular cross-section in which there is slidably mounted a bar 36 by gibs 37—37 bolted to the carrier along the opposite sides of the way over the edges of the bar.

Figure 4:
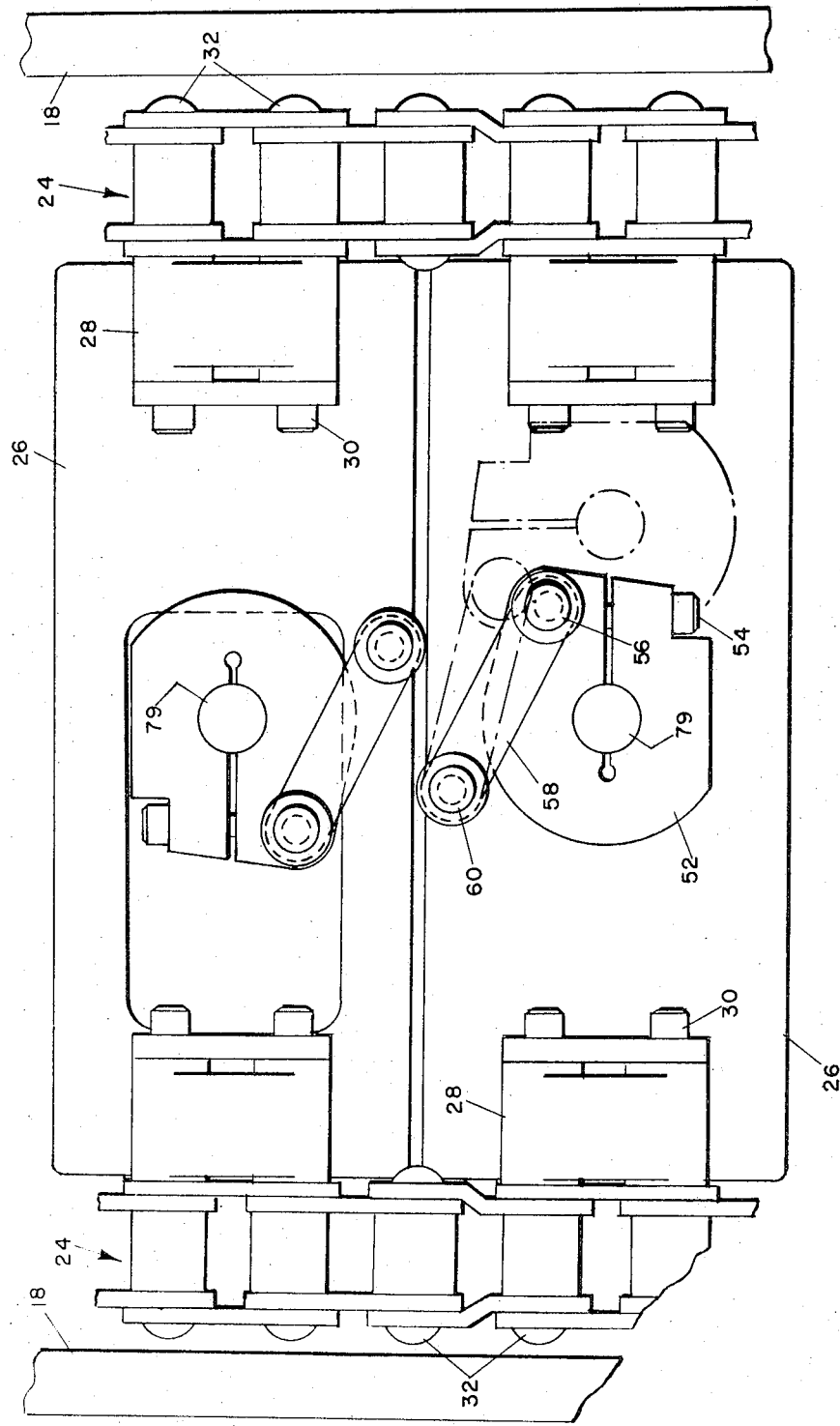
FIG. 4 is a fragmentary view taken on the line 4—4 of FIG. 3.

Each bar 36 has mounted on it one of the instrumentalities 12 which comprises a pair of pivotally supported confronting jaws 38—38 (FIG. 3) mounted on pins 40—40 supported in a slot 42 in one end of a post 44 rotatably supported in a bearing assembly 46 secured to the bar 36 by fastening means 48. The post extends through the bar 36 and through a slot 50 in the carrier 26 and has secured to its projecting end a split clamp plate 52 secured thereto by a bolt 54. Each clamp plate 52 has fixed to it at a radial distance from the axis of rotation of the post a pin 56 (FIG. 4) upon which is pivotally mounted one end of a link 58. The opposite end of the link is pivotally mounted on a pin 60 secured to the carrier 26 and this link provides, as will appear hereinafter, for effecting rotation of the jaws about the vertical axis of the post 44.

The post 44 contains a central, longitudinally extending opening in which there is mounted a rod 62, the rod being supported at the opposite ends of the post by bearing sleeves 64 and 66 for movement longitudinally thereof. One end of the rod 62 has a double rack 68 which meshes with pinions 70—70 fixed to the pins 40—40 on which the jaws 38—38 are mounted so that longitudinal movement of the rod will effect rotation of the pinions and correspondingly open and close the jaws. The post 44 contains a chamber 72 intermediate the sleeves 64 and 66 within which there is mounted a spring 74 which bears at one end against an end of the chamber and at its other end against a shoulder 76 on the rod so that spring pressure is applied to the rod 62 in a direction to maintain the jaws in a closed position. The rod projects from the post inwardly of the carrier and has at its end an adjustably mounted pin 78 provided with a head 79 which, as will appear hereinafter, provides means for separating the jaws on appropriate occasion.

Figure 2:
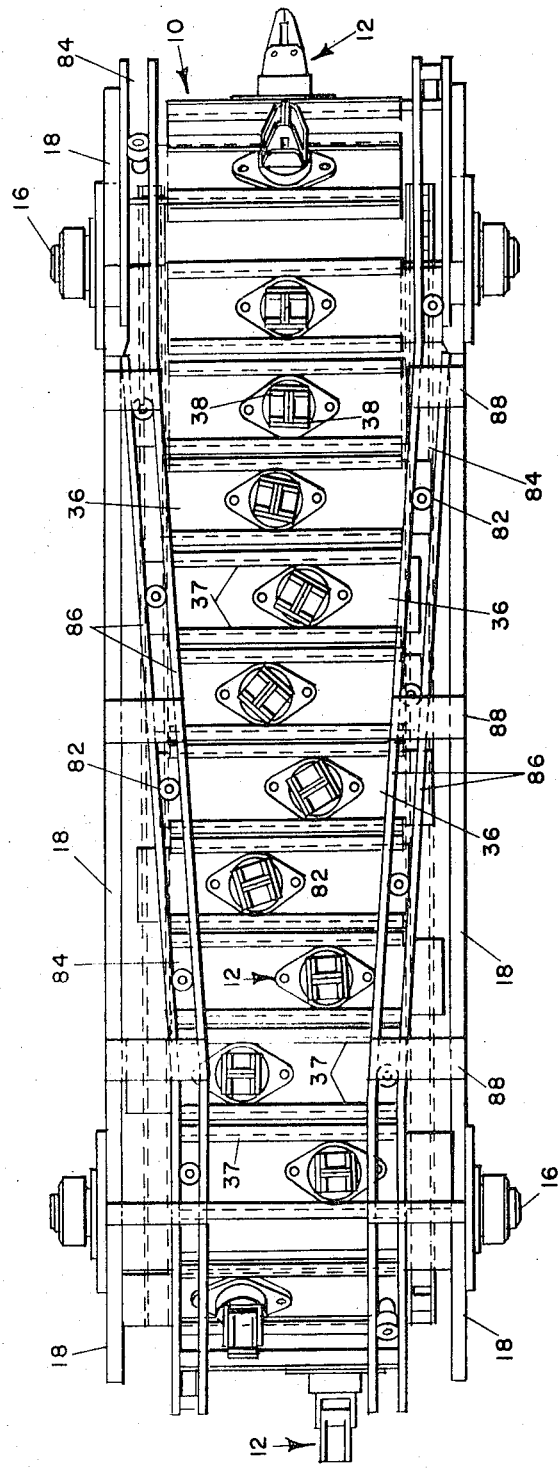
FIG. 2 is a plan view with the cover removed.

As related earlier, the bar 26 supporting the jaws is movable transversely on the carrier and such movement is effected by means of a pin 80 fixed to the end of the bar on which there is rotatably mounted a cam roller 82 which is engaged within a cam groove 84 formed in a cam plate 86 fastened by means of brackets 88 to the side member 18. There are cam plates 86 at each side of the conveyor and the alternate and intermediate bars are provided, respectively, with pins 80 at one end for engagement with the cam groove at that end. The cam plates 86 are mounted by means of brackets 88—88 along the upper and lower runs of the chains and, as shown in FIG. 2, the cam grooves 84 extending along the lower run converge from a maximum spacing at the righthand end so that as the carriers are advanced from right to left the bars are moved transversely in opposite directions to displace the jaws with respect to the centerline of the conveyor. This displacement provides for depositing the tea bags taken from the single row of tea bags at the place of presentation in two rows side-by-side. The cam grooves parallel to the upper run diverge from a minimum spacing at the left end of the apparatus to a maximum spacing at the right to return the jaws to the centerline of the conveyor coinciding with the line of delivery of the tea bags thereto.

The tea bags are presented to the orienting conveyor in single file edge-to-edge by means of the conveyor 11 (FIG. 5) upon which they are releasably supported, with the plane of their edges coinciding substantially with the center line of the orienting conveyor and with their upper edges situated at levels intersecting the path of movement of the jaws on the lower run of the conveyor. The jaws 38—38 at the place of meeting with the packets must be disposed with their confronting gripping faces in planes parallel to the opposite sides of the packet. The aforesaid linkage 58 is designed so that when the bars supporting the jaws are equidistant from opposite sides of the chains the jaws occupy the aforesaid position and are in a position to take hold of the upper edges of the packets. As the carriers move from this position toward the place of deposit the cam tracks move the bars transversely and during such transverse movement the aforesaid linkage 58 rotates the jaws approximately 90° to dispose the packets at right angles to the longitudinal centerline of the conveyor and in parallel relation to each other. On the return movement of the jaws from the place of deposit to the place of presentation of packets thereto, the bars are moved transversely to their initial position to return the jaws to their initial position for receiving packets.

The jaws are spread apart at the place of presentation of packets thereto; closed upon the packets as they travel in proximity with the conveyor 11 and are maintained closed as they travel toward the place of deposit; separated at the place of deposit; allowed to close upon each other as they move away from the place of deposit back to the place of presentation; and separated as they again approach the place of presentation for engagement with the packets. Actuation of the jaws is provided for by cam members 90 (FIG. 1) mounted inwardly of the conveyor chains for engagement with the heads 79 of the pins 78 projecting inwardly from the jaws. The configuration of the cam members 90 are such that as the jaws travel around the right-hand end of the structure toward the place of presentation of the packets they depress the pins 78 so as to open the jaws and hold them open until they move into position of interception with the upper edges of the packets and thereafter release the pins so that the jaws are closed by the springs 74 to grip the packets. At the left end of the apparatus the cam members again depress the pins to open the jaws so as to release the packets and after the packets have been released disengage the pins to allow the jaws to come together. The cam members 90 are supported on the cross-frame members 20 by bracket members 91.

Figure 5:
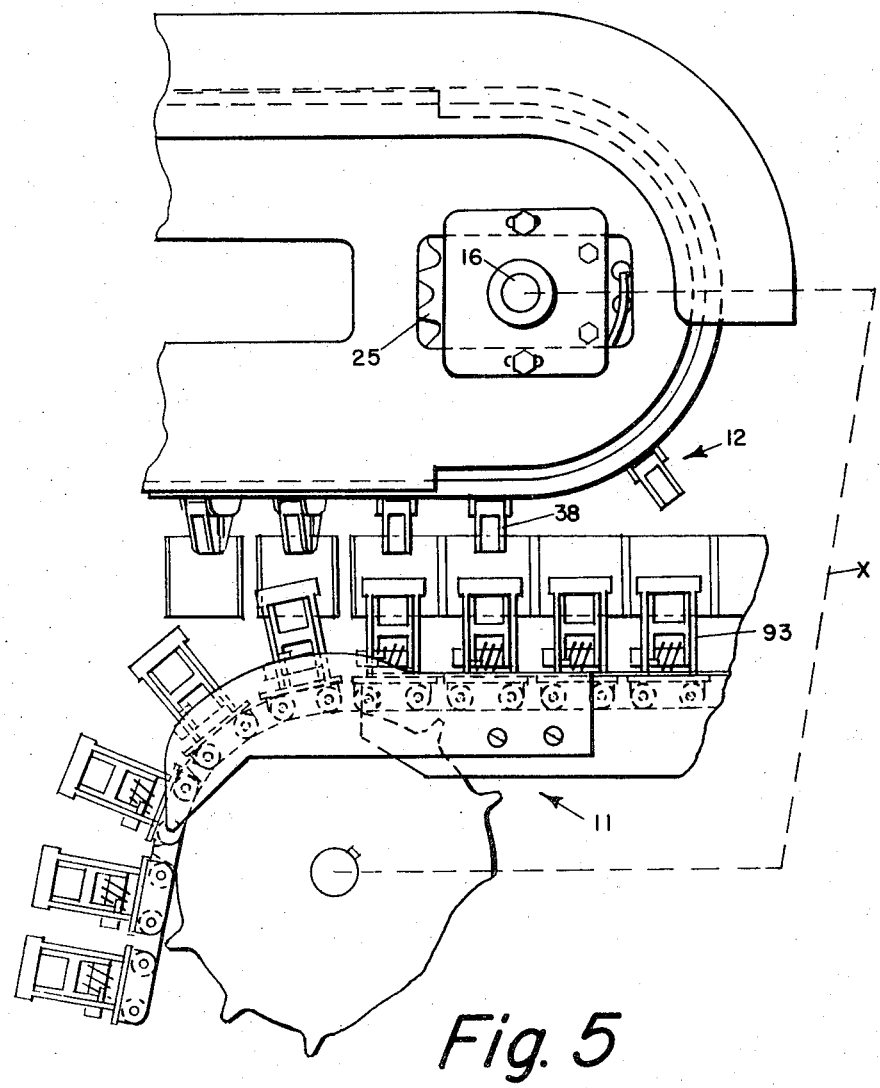
FIG. 5 is a fragmentary elevation showing a portion of the conveyor by means of which the tea bags are delivered to the orienting conveyor of this invention.

The tea bags are presented to the jaws in timed relation with the movement of the jaws by means of the conveyor 11, a portion of which is shown in FIG. 5, on which there are clamps 93 which releasably hold the tea bags at their lower edges with their upper edges in a position to be grasped by the jaws as they move around to the lower run of the conveyor. Movement of the two conveyors in timed relation with each other so as to present tea bags to the instrumentalities as the latter move into position for receiving them is accomplished by a mechanical drive diagrammatically illustrated at X which maintains them in timed relation to each other.

The apparatus as described is designed primarily to take flat envelope-like packets delivered thereto in a single line edge-to-edge, turn them to approximately 90° and then deposit them face-to-face in parallel engagement for counting and subsequent packaging. The counter comprises spaced parallel belts having upper horizontal runs travelling from the place of deposit away from the orienting conveyor on which there are mounted transversely spaced, parallel, upstanding blades between which the packets are deposited by the jaws on the orienting conveyor as they are opened, one packet between each adjacent pair of blades. If desired, the two rows of packets may be deposited side-by-side on a single belt of suitable width.

Figure 6:
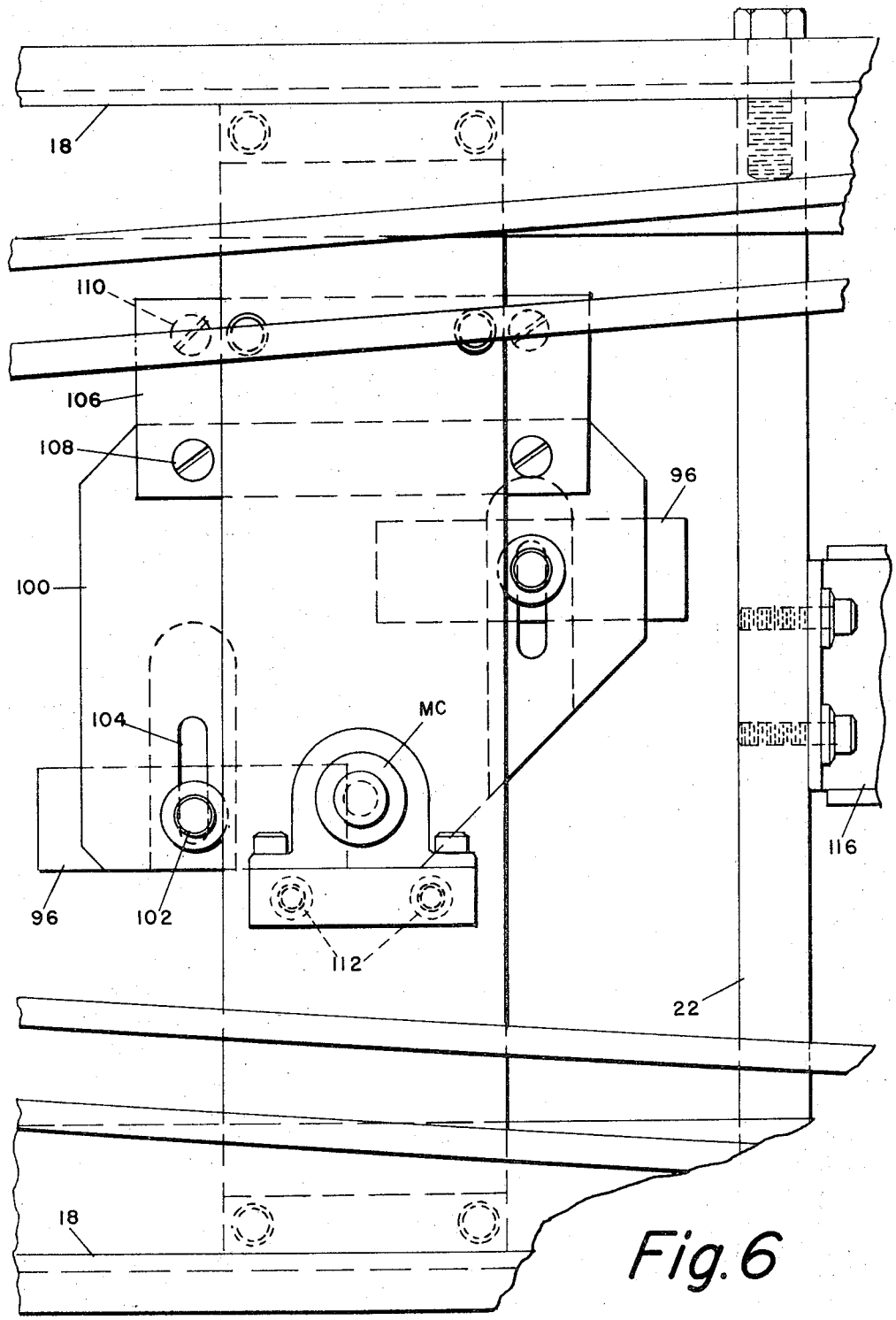
FIG. 6 is a fragmentary plan view taken on the line 6—6 of FIG. 1.

If for any reason it is desirable to reject the packets prior to reaching the place of deposit such, for example, that the counter belts are not running or that the conveyor delivering the packets to the orienting conveyor is not functioning properly as, for example, not separating successive packets or is causing mutilation of the packets, there is provided means for effecting separation of the jaws so as to release the packets and allow them to fall into a receptacle supported below the conveyor. As herein illustrated, the means for effecting release of the packets comprises cam members 96—96 (FIGS. 1, 6 and 7) supported intermediate the place of presentation and the place of discharge at a level such that their lower surfaces 98—98 are above the upper ends of the heads 79 of the pins 78 so that the heads under normal operating conditions will pass below the cams without being depressed. The cam members 96—96 are mounted in transversely spaced positions (FIGS. 6 and 7) so as to be respectively above the heads 79 of the actuating pin 78 which, at this position, have been laterally displaced in opposite directions with respect to the center line and are mounted on a supporting plate 100 by means of bolts 102 extending through slots 104 screwed into the cam members. The plate 100 is supported along one edge by a hinge member 106 which may be a flexible plate, one edge of which is secured to the plate 100 by screw bolts 108 and the other edge of which is secured to the frame by screw bolts 110. A motor Mc is mounted by means of bolts 112 to the frame above the plate 100 and has protruding from its lower end a piston rod 114 (FIG. 7) which is operable to depress the plate 100 far enough to bring the cam members 96—96 into the path of movement of the heads 79 at the upper ends of the pins 76 so that the cam surfaces 96—96 will depress these pins and separate the jaws. The motor Mc is pressure-operated and is supplied with pressure fluid in conventional manner through a valve V (FIG. 8), operation of the latter being effected manually or automatically in response to a sensing device or sensing devices S1, S2, the sensing device S1 being located at the place of deposit to detect the malfunctioning of the counter and the sensing device S2 being located in a position to determine whether the packets held by the jaws are mutilated or otherwise unfit for packing. In FIG. 8 the valve V is shown in a circuit containing the sensing devices S1, S2 which are in the form of electric eyes. The valve V is operated by a rotary solenoid R, the latter also being manually rotatable by a knob K.

Because of the rather high speed operation of the apparatus it is desirable to keep the heads 79 at the upper ends of the pins 78 lubricated so that excessive wear is minimized. Accordingly, a receptacle 116 (FIGS. 1 and 6) is mounted on the frame above the path of movement of the pins 78, at the bottom of which there is a pad 118 in the form of a wick which will take the oil from the receptacle and transfer it by rubbing engagement to the heads 79. An oil cup 120 provides for replenishing the receptacle 116 with oil when required.

The physical configuration of the conveyor, as herein illustrated, is not to be considered as limiting since it is evident that in place of link chains entrained about spaced sprockets a wheel supplied with spaced parallel circular frame members mounting carriers peripherally thereof provided with suitably arranged cams would be equally effective for the intended purpose.

While the invention has been described specifically with reference to handling tea bags, it is within the scope of the invention to handle packets of the same kind and packets comparable thereto regardless of their configuration and/or the filling contained thereby.

It should be understood that the present disclosure is for the purpose of illustration only and that this invention includes all modifications and equivalents falling within the scope of the appended claims.

I claim:

1. A method of handling limp flat envelope like packets containing particulate material comprising taking hold of the top edges of successive envelopes in a line of envelopes delivered thereto with their broad sides parallel to the direction of movement so as to hold the envelopes in suspension, advancing the envelopes while so held along a predetermined path, while advancing the envelopes rotating successive envelopes about a perpendicular axis passing through their edges to dispose the broad sides at a predetermined angle to the direction of advance and depositing the successive packets on an edge in a column collocated face to face.

2. A method of handling limp flat envelope like packets delivered in a line with their broad sides in a common plane comprising taking hold of the top edges of the successive envelopes so as to hold them in suspension, advancing the suspended envelopes along a predetermined path and while advancing them rotating them about a perpendicular axis in the plane of the envelopes perpendicular to said edges to a plane at an angle to said common plane and then releasing the packets in a column in which the packets rest on edge collocated face to face.

3. A method of handling limp flat envelope like packets containing particulate material delivered in line in succession and in a vertical plane with their edges aligned in said plane, comprising taking hold of the upper edges of the successive packets to hold them in suspension, advancing the packets along a predetermined path and rotating each packet from said vertical plane about a vertical axis in said plane to a plane situated at an angle thereto and depositing the packets on edge in a column face to face.

4. The method of handling limp flat envelope like packets delivered thereto in succession with their broad sides in a vertical plane and their edges aligned in said vertical plane comprising taking hold of the upper edges of said packets in succession to hold the packets in suspension, moving the successive packets linearly along a predetermined path and while so moving them along said predetermined path moving said packets transversely to a position paralleling said vertical plane and when said packets have been moved to said lateral position depositing them on edge successively to form a column of packets collocated face to face.

5. A method of handling limp flat envelope like packets delivered thereto in lines insuccession with their broad sides in a common plane and with their vertical edges aligned comprising taking hold of the upper edges of said packets in succession to hold them in suspension moving successive suspended packets linearly along a predetermined path while moving them along said predetermined path moving them transversely and simultaneously rotating them about an axis situated in said plane and perpendicular to said edges to dispose them in planes transverse to said vertical plane and depositing said packets on edge in a column collocated face to face.

6. The method of reforming a single line of limp flat envelope like packets containing particulate material disposed with their broad sides in a common vertical plane and with their edges aligned to form a column of such packets wherein the packets are disposed broad side to broad side, comprising grasping the upper edge of each packet in succession to hold it in suspension, moving the packets along a predetermined path in spaced relation to each other, while so moving the packets rotating them into planes transverse to said vertical plane and when the packets reach a predetermined position along said path after having been rotated to their transverse positions releasing them to form a column of packets disposed on edge broad side to broad side.

7. The method of reforming a single line of limp flat envelope like packets disposed with their broad sides in a vertical plane and with their edges aligned to form two columns of such packets side by side wherein the packets in each column are disposed broad side to broad side, comprising grasping the upper edge of each packet in succession to hold it in suspension, moving the packets along a predetermined path in spaced relation to each other while so moving the packets moving successive packets in opposite directions transversely of said path to a lateral position paralleling said path and simultaneously rotating them into planes transverse to said vertical plane, and when the packets reach a predetermined position along said path, after having been moved to said lateral positions and rotated to said transverse positions, releasing them to form two columns of packets, and wherein the packets in each column are disposed on edge broad side to broad side.

* * * * *

UNITED STATES PATENT OFFICE
CERTIFICATE OF CORRECTION

Patent No. 3,837,474          Dated September 24, 1974

Inventor(s) ARTHUR ALAN BROOKE

It is certified that error appears in the above-identified patent and that said Letters Patent are hereby corrected as shown below:

On the cover sheet [73], the assignee should read as follows: -- Delamere & Williams Company, Limited, Toronto, Ontario, Canada -- .

Signed and sealed this 10th day of December 1974.

(SEAL)
Attest:

McCOY M. GIBSON JR.
Attesting Officer

C. MARSHALL DANN
Commissioner of Patents